3,029,167
IMPREGNATION METHOD AND CARBONACEOUS ARTICLES IMPREGNATED WITH SALTS OF ORGANO PHOSPHORIC ACID
Robert K. Carlson, Deerfield, Ill., and Warren C. Schwemer, Arlington, Tex., assignors to Borg-Warner Corporation, Chicago, Ill., a corporation of Illinois
Filed July 16, 1959, Ser. No. 827,554
11 Claims. (Cl. 117—228)

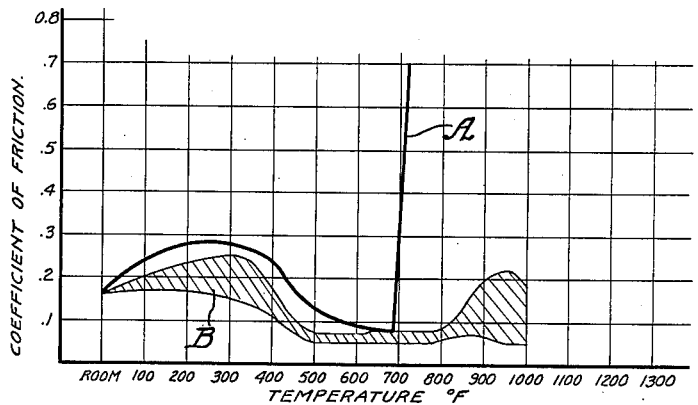
Fig. 1 — Frictional behavior of salts of organo acid phosphates impregnated into graphite.
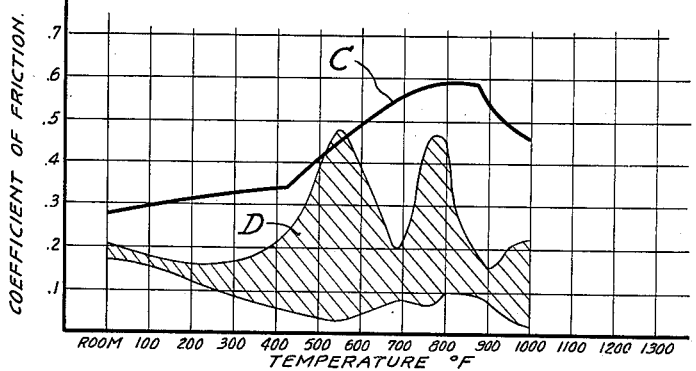
Fig. 2 — Frictional behavior of salts of organo acid phosphates impregnated into carbon-graphite.
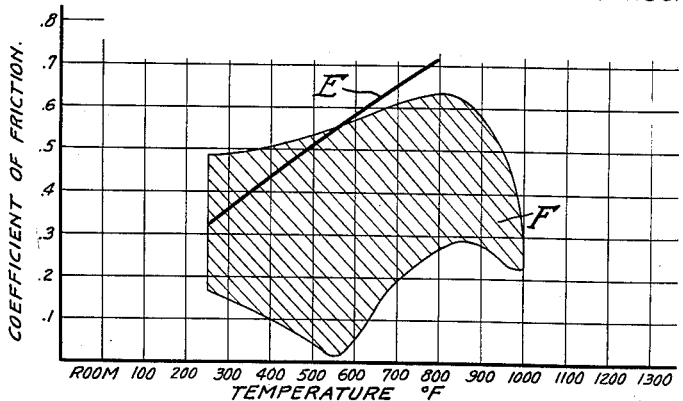
Fig. 3 — Frictional behavior of salts of organo acid phosphates impregnated into carbon.
Inventors
Robert K. Carlson and
Warren C. Schwemer

United States Patent Office 3,029,167
Patented Apr. 10, 1962

This invention relates to the use of salts of organo phosphoric acids for impregnating carbon and graphite bodies for the purpose of eliminating or strongly inhibiting the oxidation of carbon and graphite at elevated temperatures and also to decrease the coefficient of friction of carbon and graphite bodies.

Carbon oxidizes in air at a measurable rate at approximately 680 degrees F., while graphite reacts at approximately 840 degrees F. The high degree of reactivity of carbon and graphite at elevated temperatures in oxidizing atmospheres is a well known phenomenon. The poor oxidative resistance of carbonaceous materials has limited the use of this otherwise excellent material in many high temperature applications, such as found in the rocket and missile field. In the areas of industrial applications, the use of carbon anodes in aluminum and graphite electrodes in steel are well known, however, oxidative attack at operating temperatures has increased consumption of carbonaceous bodies by 15–30% in many cases. If the high temperature reactivity could be eliminated or substantially reduced, increased performance and lower operating costs could be expected in many present and contemplated applications.

Not all of the carbon and graphite surfaces are reactive to the oxygen but apparently there are certain sites on the surfaces that appear to be reactive to the oxygen that is present. The oxygen and reactive sites combine, forming carbon monoxide and carbon dioxide products. In this way, the actual carbon or graphite structure is attacked and actually turns into a gaseous product. The metal salts of organo phosphoric acids which we used covers the carbon atom reactive sites so that the oxygen cannot react with the carbon. It is an absorbed, intimate protective coating over the carbon, thus leaving no area or site where the oxygen can diffuse or chemically combine.

We have found that solutions of salts of organo phosphoric acids impregnated into the porous structure of shaped carbonaceous articles will eliminate or strongly inhibit oxidation up to approximately 1300 degrees F. Substantial inhibition is also observed at 1400 degrees F. and higher. We have found that the degree of inhibition varies considerably with the type and grade of carbon or graphite used at any given temperature. In general, a greater degree of inhibition is found when the more homogeneous fine flour aggregate of coke having 100 mesh or smaller particle size is employed in the fabrication of the carbonaceous base stock to be impregnated.

In addition to the increased oxidation resistance of carbonaceous bodies which have been impregnated with salts of organo phosphoric acid, it has been found that these impregnants also reduce the coefficient of friction of the carbonaceous bodies under mechanical sliding conditions, particularly at elevated temperatures.

It has long been known that graphite possesses lubricating qualities under dry sliding conditions. For many years, carbonaceous bearings and seals have been used in applications where oil or grease lubrication has not been feasible. Since graphite's lubricating quality depends upon absorbed water or organic vapor content, attempts to use graphite at temperatures exceeding the volatile stability of the absorbed constituent results in abnormally high frictional characteristics.

The manufacture of these impregnated carbonaceous bodies, preferably, should go through a firing process, as hereafter shown. However, lack of firing does not hinder the impregnant's capacity for reducing oxidation at elevated temperatures. On the other hand, the coefficients of friction with respect to these impregnated carbonaceous bodies are somewhat higher in the initial rubbing and sliding stages when in a non-fired state. However, continued use lowers the coefficient of friction to approximately the same level as that found in impregnated carbonaceous bodies which have been fired.

It is therefore an important object of this invention to provide an impregnated carbonaceous article which will resist oxidation to a high degree at high temperature.

It is another object to provide a superior impregnant for carbonaceous bodies which will greatly improve resistance to oxidation at high temperature.

It is another object to decrease the coefficient of friction of a carbonaceous body by impregnating it with salts of organo phosphoric acid.

It is a further object to provide a method for producing carbonaceous articles by impregnation with salts of organo phosphoric acid and heat treatment.

This invention will be described in connection with the accompanying drawing, which shows three graphs covering the coefficient of friction of carbon, carbon-graphite and graphite bodies impregnated with salts of organophosphoric acid and unimpregnated carbon, carbon-graphite and graphite bodies as determined from the tests hereinafter described.

FIG. I shows the efficiency of various organo phosphate salts as impregnants in reducing a graphite body's friction coefficient;

FIG. II shows the efficiency of various organo phosphate salts as impregnants in reducing a carbon-graphite body's friction coefficient; and FIG. III shows efficiency of various organo phosphate salts as impregnants in a carbon body for reducing frictional coefficient.

In our experiments we have used the zinc salts of mono diethyl acid orthophosphate and zinc, copper and iron salts of diethyl acid pyrophosphate as impregnants.

These impregnants are produced by synthesis. The zinc salt of mono diethyl acid orthophosphate is produced by the reaction of stoichiometric amounts of zinc chloride and mono diethyl acid orthophosphate. The metal (zinc, copper, iron) salts of diethyl acid pyrophosphate are produced by the reactions of stoichiometric amounts of metal (zinc, copper, iron) chloride and diethyl pyrophosphate. The determination of the stoichiometric amount of organo phosphoric acids with respect to metal (zinc, copper, iron) chloride is determined by titration with standardized sodium hydroxide to a pH of 9.3 The mixture, in either case, is stirred until all of the zinc chloride dissolves and completion of the reaction is determined by the stability of the hydrogen chloride concentration. Ethyl alcohol may be added to the impregnant in order to reduce the viscosity and thereby increase its facility for impregnation.

It was found that these processes could be carried out in a temperature range from room temperature to 350 degrees C., in which event the entire amount of metal (zinc, copper, iron) chloride may be added at once, or slowly, to the acid phosphate and the mixture stirred until all of the metal (zinc, copper, iron) chloride dissolves and reacts and the evolution of hydrogen chloride has subsided. The reaction time is found to be from 1–96 hours, depending on the rate of agitation, and the temperature of the reaction.

Impregnant compounds as shown above, and more specifically, as detailed in Examples I and II below, were prepared. The synthesis of the zinc organo phosphate impregnants is illustrated below. The synthesis of the copper and iron organo phosphates are prepared similarly according to stoichiometric ratios.

EXAMPLE I

*Preparation of Zinc Salts of Mono Diethyl Acid Orthophosphate Impregnant Solution*

(a) 136.3 grams of zinc chloride were dissolved in 30 ml. of water, which had been placed in a beaker. We found that if the zinc chloride did not go rapidly into solution a few drops of hydrochloric acid would be helpful.

(b) 187 grams of mono diethyl acid orthophosphate were added to the zinc chloride solution and stirred for a period of 96 hours at room temperature to reduce the hydrochloric acid contents and produce a satisfactory impregnant.

EXAMPLE II

*Preparation of Zinc Salts of Diethyl Acid Pyrophosphate Impregnant Solution*

(a) 184.0 grams of diethyl acid pyrophosphate were placed in a one liter beaker.

(b) 136.3 grams of zinc chloride were placed in a 400 ml. liter beaker.

(c) The diethyl acid pyrophosphate was carefully heated over a hot plate to a temperature of between 80 degrees–85 degrees C.

(d) The zinc chloride was then added slowly to the heated diethyl acid pyrophosphate and stirred rapidly until the zinc chloride dissolved into the diethyl acid pyrophosphate.

(e) After all the zinc chloride had been dissolved into the diethyl acid pyrophosphate solution, which took approximately four hours, 15 ml. of 95% absolute ethyl alcohol was added to reduce the solution viscosity of the impregnant.

The impregnating procedure included placing the carbonaceous specimens in a vacuum kettle and proceeding in the following manner.

A vacuum was applied for a one hour period at the 1 to 2 mm. mercury range. The impregnant, held in a separatory flask above the kettle, was allowed to go into the kettle so as to be absorbed by the carbonaceous body. After a period time, the vacuum was released and the atmospheric pressure was utilized to drive the impregnant into the carbonaceous body. After approximately ½ hour the carbonaceous body was removed from the solution and transferred to a high pressure vessel and a pressure of 2,000 p.s.i. was applied in order to force more impregnant into the carbonaceous body. The carbonaceous body was then weighed, placed in an oven at a temperature of approximately 40 degrees C., and the temperature was increased slowly to 90 degrees C. This preliminary heating is for the purpose of dehydrating the carbonaceous body. It may be done at room temperature, but this would reuqire a long period of time. The application of heat, however, should not be too sudden or too high so as to cause exudation of the impregnant. (In another impregnating procedure the temperature was increased 10 degrees C. per each 4 to 8 hours until the 90 degrees C. was reached.) The carbonaceous body was weighed again and placed in a high temperature furnace and heated to 400 degrees C. in 4 hours in steps of 100 degrees C. an hour. (In a properly designed oven, removal to another oven would not be necessary.) After this the temperature was increased as rapidly as possible to 900 degrees C. This heat treatment was given under an atmosphere of nitrogen. The carbonaceous body was weighed again to determine the percentage of impregnant pickup.

Comparative oxidation tests were made between carbonaceous specimens before treatment and after treatment with the above mentioned impregnants. The following tables show the results of these tests, which clearly indicate the superiority of the carbonaceous bodies of this invention as against untreated carbonaceous bodies.

A comparison of the reactivity of carbon, carbon-graphite and graphite of this invention impregnated with zinc salt of mono diethyl acid orthophosphate, and the metal salts (zinc, copper, iron) of diethyl acid pyrophosphates with unimpregnated carbon, carbon-graphite and graphite is presented in Tables I, II and III.

The physical properties of the carbon, carbon-graphite and graphite used were as follows:

CARBON (PHYSICAL PROPERTIES)

| | |
|---|---|
| Amount density, gm./cc | 1.55 |
| Ash percent (max.) | 2.0 |
| Transverse breaking strength (p.s.i.) | 3000 |
| Specific electrical resistance (ohm-inches) | 0.0016 |
| Porosity, percent | 23 |

CARBON-GRAPHITE (PHYSICAL PROPERTIES)

| | |
|---|---|
| Apparent density, gm./cc | 1.65 |
| Ash, percent (max.) | 1.0 |
| Transverse breaking strength (p.s.i.) | 4200 |
| Maximum particle size | .008 |
| Porosity, percent | 25 |
| Specific electrical resistance (ohm-inches) | .00090 |

GRAPHITE (PHYSICAL PROPERTIES)

| | |
|---|---|
| Maximum particle diameter: | |
| (a) Inches | .0082 |
| (b) Millimeters | .208 |
| Apparent density, g./cm.$^3$, ave. | 1.75 |
| Porosity, percent, average | 20.4 |
| Breaking strength, p.s.i., minimum: | |
| Parallel to pressure | — |
| Perpendicular to pressure | 4000 |
| Scleroscope hardness average | 40 |
| Ash, percent, average | .100 |

TABLE I

*Oxidation of Graphite Impregnated With Organophosphate Salts*

| Impregnant | Percent Impregnant | Percent Weight Loss After 1 Hour at 1,200 F. | Percent Weight Loss After 1 Hour at 1,400 F. |
|---|---|---|---|
| None | | 12.0 | 100.0 |
| Zinc Diethyl Acid Pyrophosphate [1] | 9.8 | 0.85 | 14.0 |
| Zinc Diethyl Acid Pyrophosphate [2] | 7.6 | 0.0 | 18.0 |
| Iron Diethyl Acid Pyrophosphate [2] | 6.8 | 0.0 | 51.0 |
| Copper Diethyl Acid Pyrophosphate [2] | 6.1 | 1.3 | 41.0 |
| Zinc Mono Diethyl Acid Orthophosphate [2] | 8.4 | .63 | 24.0 |

[1] No alcohol added during synthesis of impregnant.
[2] Alcohol added during synthesis of impregnant.

TABLE II

*Oxidation of Carbon-Graphite Impregnated With Organophosphate Salts*

| Impregnant | Percent Impregnant | Percent Weight Loss After 1 Hour at 1,200 F. | Percent Weight Loss After 1 Hour at 1,400 F. |
|---|---|---|---|
| None | | 61.0 | 100.0 |
| Zinc Diethyl Acid Pyrophosphate [1] | 5.4 | 21.0 | 62.0 |
| Zinc Diethyl Acid Pyrophosphate [2] | 3.8 | 22.0 | 86.0 |
| Iron Diethyl Acid Pyrophosphate [2] | 1.6 | 0.87 | 87.0 |
| Copper Diethyl Acid Pyrophosphate [2] | 2.0 | 31.0 | 86.0 |
| Zinc Mono Diethyl Acid Orthophosphate [2] | 7.2 | 22.0 | 67.0 |

[1] Same as Table I.
[2] Same as Table I.

TABLE III

*Oxidation of Carbon Impregnated With Organophosphate Salts*

| Impregnant | Percent Impregnant | Percent Weight Loss After 1 Hour at 1,200 F. | Percent Weight Loss After 1 Hour at 1,400 F. |
| --- | --- | --- | --- |
| None | | 100 | 100 (45 min.) |
| Zinc Diethyl Acid Pyrophosphate [1] | 9.5 | 15.0 | 59.0 |
| Zinc Diethyl Acid Pyrophosphate [2] | 7.3 | 11.0 | 51.0 |
| Iron Diethyl Acid Pyrophosphate [2] | 6.1 | 17.0 | 51.0 |
| Copper Diethyl Acid Pyrophosphate [2] | 7.4 | 15.0 | 47.0 |
| Zinc Mono Diethyl Acid Orthophosphate [2] | 7.2 | 19.0 | 59.0 |

[1] Same as Table I.
[2] Same as Table I.

It will be observed in Tables I, II and III that the impregnated carbonaceous bodies have a greater inhibition to oxidation than the unimpregnated and the degree of oxidation inhibition is dependent upon the type of carbonaceous base stock used and the amount and chemical composition of the impregnant.

Comparative friction tests were made between impregnated carbonaceous specimens of this invention and unimpregnated carbonaceous specimens.

Identical one inch disc shaped specimens were prepared from carbon, carbon-graphite and graphite having the physical properties heretofore stated. Some of these discs were impregnated with the zinc salt of mono diethyl acid orthophosphate and the metal salts of diethyl acid pyrophosphate, and processed according to this invention, and comparative tests between these and the unimpregnated specimens were run on an apparatus that rotated the specimens against a chrome-plated steel face lapped to 8 R.M.S. Identical pressures were applied in the tests and torque readings were used to determine the coefficient of friction with respect to the specimens. The results of these tests are graphically shown in FIGURES I, II and III of the drawing.

In FIGURE I, graphite bodies were used as a base stock and four specimens were made each being impregnated with one of four salts of organo acid phosphates, namely; zinc salt of diethyl acid pyrophosphate, zinc salt of mono diethyl acid orthophosphate, iron salt of diethyl acid pyrophosphate and copper salt of diethyl pyrophosphate. It was observed that as long as the absorbed water vapor remained within the pores of the unimpregnated graphite the coefficient of friction remained in the .20 to .35 range, however, when the temperature was elevated to the range in which the majority of the absorbed vapor was volatized off, the coefficient of friction increased rapidly to an extremely high value, as indicated in A. However, in the impregnated graphite specimens it was observed that the coefficients of friction were much lower than those found in the unimpregnated specimens, and in addition the coefficient of friction decreased as the temperature increased to a stable low frictional value up to 1000 degrees F., as indicated in the shaded area B, which shows the area within which all four specimens fell.

In FIGURE II, carbon-graphite bodies were used as a base stock and four specimens were made each being impregnated with one of the four salts of organo acid phosphates used in FIGURE I. The reduced frictional coefficient of the four carbon-graphite bodies, each containing one of the impregnants shown, were run in a comparative test with unimpregnated carbon-graphite bodies. A considerable reduction in the frictional coefficient was observed as indicated in the graph in which C represents the frictional coefficient of the unimpregnated carbon-graphite specimen and D shows the area within which all four impregnated specimens fell.

In FIGURE III carbon bodies were used as a base stock and four specimens were made each being impregnated with one of the four salts of organo acid phosphates in FIGURE I. The reduced frictional coefficient of the four carbon bodies, each containing one of the impregnants shown, were run in a comparative test with unimpregnated carbon bodies. A reduction in the friction coefficient was observed as indicated in the graph in which E represents the frictional coefficient of the unimpregnated carbon specimens and F shows the area within which all four impregnated specimens fell. The efficiency of the frictional coefficient of the base stock specimens produced by being impregnated with salts of organo phosphoric acid depends on the impregnant used and is in the following order with respect to each base stock:

Zinc salt of diethyl acid pyrophosphate
Zinc salt of mono diethyl acid orthophosphate
Iron salt of diethyl acid pyrophosphate
Copper salt of diethyl acid pyrophosphate It will be observed from the above tests that carbon combined with graphite as a base stock has a higher coefficient of friction than the graphite stock by itself and that carbon by itself as a base stock was the highest of the three from this standpoint.

The constant low coefficient of friction from 800 degrees F. to 1200 degrees F. is believed to open many new avenues, for the application of carbonaceous materials treated with the impregnants of this invention, in sliding dry bearing and seal applications.

While certain representative embodiments and details of our invention have been shown, it is to be understood that we are not limited thereby, except only insofar as the appended claims may be so limited, as it will be understood by those skilled in the art that changes may be made without departing from the principles of our invention.

We claim:
1. An article comprising a carbon body impregnated with a metal salt of organo phosphoric acid.
2. An article comprising a carbon body impregnated with a metal salt of organo phosphoric acid, said metal being selected from the group consisting of zinc, copper and iron.
3. An article comprising a carbon body impregnated with a zinc salt of mono diethyl acid orthophosphate.
4. An article comprising a carbon body impregnated with a zinc salt of diethyl acid pyrophosphate.
5. An article comprising a carbon body impregnated with an iron salt of diethyl acid pyrophosphate.
6. An article comprising a carbon body impregnated with copper salt of diethyl acid pyrophosphate.
7. A process for inhibiting the oxidation and decreasing the coefficient of friction of carbon and graphite bodies comprising the step of impregnating said carbon and graphite bodies with a metal salt of organo phosphoric acid, said metal being selected from the group consisting of zinc, copper and iron.
8. A process for inhibiting the oxidation and decreasing the coefficient of friction of carbon and graphite bodies comprising the step of impregnating said carbon and graphite bodies with a salt of mono diethyl acid orthophosphate.
9. A process for inhibiting the oxidation and decreasing the coefficient of friction of carbon and graphite bodies comprising the step of impregnating said carbon and graphite bodies with a zinc salt of diethyl acid pyrophosphate.
10. A process for inhibiting the oxidation and decreasing the coefficient of friction of carbon and graphite bodies comprising the step of impregnating said carbon and graphite bodies with an iron salt of diethyl acid pyrophosphate.

11. A process for inhibiting the oxidation and decreasing the coefficient of friction of carbon and graphite bodies comprising the step of impregnating said carbon and graphite bodies with a copper salt of diethyl acid pyrophosphate.

References Cited in the file of this patent

UNITED STATES PATENTS

| | | |
|---|---|---|
| 2,756,175 | Goldstein et al. | July 24, 1956 |
| 2,790,765 | Otto et al. | Apr. 30, 1957 |
| 2,868,672 | Johnson et al. | Jan. 13, 1959 |
| 2,909,452 | Parriss et al. | Oct. 20, 1959 |